United States Patent

Hayash, Jr. et al.

[15] 3,673,128
[45] June 27, 1972

[54] CELLULAR POLYOXAZOLIDINONE ELASTOMERS FROM POLYISOCYANATES AND POLYEPOXIDES

[72] Inventors: Edward F. Hayash, Jr., Killingworth; Harold E. Reymore, Jr., Wallingford; Adnan A. R. Sayigh, North Haven, all of Conn.

[73] Assignee: Upjohn Company, Kalamazoo, Mich.

[22] Filed: April 8, 1968

[21] Appl. No.: 719,678

[52] U.S. Cl. .................................260/2.5, 161/190, 260/2, 260/57, 260/75
[51] Int. Cl. .................................C08g 22/46, C08g 22/16
[58] Field of Search ..............260/2.5 AT, 2.5 AM, 2.5 AP, 260/2.5 AW, 77.5, 77.5 A, 77.5 AM, 77.5 CR, 47 EP, 2.5 EP

[56] References Cited

UNITED STATES PATENTS

| | | | |
|---|---|---|---|
| 2,939,851 | 6/1960 | Orchin | 260/2.5 |
| 3,020,262 | 2/1962 | Speranza | 260/47 |
| 3,061,559 | 10/1962 | Henson et al. | 260/2.5 |
| 3,198,851 | 8/1965 | Hoy | 260/836 |
| 3,313,747 | 4/1967 | Schramm | 260/2.5 |
| 3,334,110 | 8/1967 | Schramm | 260/307 |
| 3,383,358 | 5/1968 | Schramm | 260/47 |
| 3,413,377 | 11/1968 | Schramm et al. | 260/830 |
| 3,242,108 | 3/1966 | McGary et al. | 260/2.5 |
| 3,471,442 | 10/1969 | Di Leone | 260/47 |

*Primary Examiner*—Hosea E. Taylor
*Assistant Examiner*—H. S. Cockeram
*Attorney*—John Kekich and Denis A. Firth

[57] ABSTRACT

High temperature resistant, low flame spread cellular polymers are disclosed. These polymers are obtained by reacting an organic polyisocyanate and a polyepoxide in approximately stoichiometric proportions in the presence of a tertiary amine catalyst (triethylene diamine preferred) and a blowing agent. Non active-hydrogen containing flame retardants, surfactants, pigments, and like additives can be incorporated into the cellular polymers of the invention. The novel cellular polymers are useful in thermal insulation and like applications where resistance to extreme temperatures and low flame spread requirements must be met.

8 Claims, No Drawings

CELLULAR POLYOXAZOLIDINONE ELASTOMERS FROM POLYISOCYANATES AND POLYEPOXIDES

BACKGROUND OF THE INVENTION

1. Field of the Invention

This invention relates to a novel process for the preparation of low density, high temperature resistant foams and to the foams so prepared and is more particularly concerned with a process for the preparation of cellular polymers by reacting approximately stoichiometric proportions of an organic polyisocyanate and a polyepoxide under foam producing conditions, and with the cellular polymers so obtained.

2. Description of the Prior Art

The formation of cellular polymers from polyisocyantes in the presence of epoxides has been described previously. For example, Nicholas and Gmitter, Journal of Cellular Plastics, pages 85 to 90, January, 1965, (see also French Pat. No. 1,441,565) describe the polymerization of a polyisocyanate or an isocyanate-terminated prepolymer, preferably in the presence of a polyol, using as catalyst a minor proportion of a polyepoxide and certain tertiary amines. In this instance the combination of polyepoxide and tertiary amine is employed in catalytic amounts, the main reaction being the polymerization of the polyisocyanate to form a polyisocyanurate.

Hoy, U.S. Pat. No. 3,198,851 describes the preparation of non-cellular products by reacting a polyisocyanate and a polyepoxide, in proportions which include substantially stoichiometric proportions, in the presence of a boron trifluoride-tertiary amine complex. The reaction mixture is heated to a temperature at which free boron trifluoride is liberated from the complex in order to initiate the reaction. No teaching is made of the one-shot preparation of cellular polymers by the above reaction.

McGary et al., U.S. Pat. No. 3,242,108 describes the preparation, inter alia, of cellular polymers by reacting a polyisocyanate and a polyepoxide in the presence of a low molecular weight polyol, usually an aliphatic diol or triol, and a boron trifluoride-amine complex as catalyst. The resulting cellular polymers contain substantial proportions of polyurethane linkages, derived by reaction of the polyisocyanate with the polyol, and are accordingly limited thereby in their ability to resist deformation on exposure to high temperatures.

Schramm, U.S. Pat. No. 3,313,747 describes the preparation of polymerizable isocyanato-substituted 2-oxazolidinones by reacting an excess of a polyisocyanate with a polyepoxide in the presence of a quaternary ammonium halide and a low molecular weight primary or secondary monohydric alcohol. The polymerizable isocyanato-substituted 2-oxazolidinone is then converted to a cellular polymer by reaction with water.

We have now found that cellular polymers having outstanding resistance to thermal degradation and low flame spread ratings can be prepared in a one-shot procedure by the direct interaction of polyisocyanates and polyepoxides in approximately stoichiometric proportions, and in the absence of any extraneous active-hydrogen containing materials. We have found also that this result can be achieved without resort to the use of boron trifluoride complex catalysts which suffer the disadvantages of toxicity, high cost, and difficulty of handling on a large scale. The cellular polymers produced by our invention, unlike those previously prepared from polyepoxides, have sufficiently low flame spread and high thermal stability to permit their use as insulation and the like for construction purposes such as in housing, office buildings, etc., which are governed by local building codes.

SUMMARY OF THE INVENTION

The novel compositions of the invention are high temperature resistant cellular polymers which comprise the product of reaction of 1. a polyisocyante;
2. a polyepoxide in a proportion of from about 0.70 equivalent to about 1.25 equivalents per equivalent of polyisocyanate;
3. a tertiary amine catalyst; and
4. a blowing agent.

The invention also includes the process of preparing the above novel compositions in a one-shot procedure by bringing together the aforesaid polyisocyanate and polyepoxide in the above stated proportions in the presence of the tertiary amine catalyst and the blowing agent.

DETAILED DESCRIPTION OF THE INVENTION

The preparation of the novel cellular polymers of the invention is readily accomplished by bringing together the polyisocyanate (I), the polyepoxide (II), the tertiary amine catalyst (III), the blowing agent and any other adjuvants (as discussed hereinafter) using agitation means sufficient to ensure homogeneity in the resultant mixture. Advantageously, all the components save the tertiary amine catalyst are mixed together in a preliminary step and the tertiary amine catalyst is added to the premix with vigorous agitation. The mixing of the components can be carried out by hand, when operating on a small scale, but is advantageously carried out using the various mixing and dispensing machines conventionally employed in the manufacture of polymer foams; see, for example, Ferrigno "Rigid Plastic Foams," Reinhold Publishing Corporation, New York, 1963.

Polymer foam formation takes place spontaneously after mixing of the various reactants set forth above and it is unnecessary to employ any heat in order to initiate the foam producing reaction.

Thus, immediately after completion of mixing of the components the foam reaction mix is poured or dispensed directly into the appropriate mold and foaming is allowed to take place in the mold in accordance with procedures well-recognized in the art for the molding of polymer foams. The foam producing reaction is highly exothermic, more so than is the case with most polymer foam forming systems, such as polyurethane foam forming systems, hitherto encountered in the art. Accordingly, allowance is made for this high exothermicity in designing the molds employed with the polymer foams of the invention.

As set forth above, the polyepoxide (II), as hereinafter defined and exemplified, is employed in a proportion corresponding to about 0.70 equivalent to about 1.25 equivalents per equivalent of polyisocyanate (I). Preferably, the polyepoxide (II) is employed in a proportion corresponding to about 0.80 equivalent to about 1.0 equivalent per equivalent of polyisocyanate (I). By "equivalents" of polyepoxide (II) is meant the molecular weight of the latter divided by the number of epoxy groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate (I) has its usually accepted meaning, namely, the molecular weight of the polyisocyanate (I), in whatever units are used to designate the amounts of the various components of the reaction mixture, divided by the number of isocyanate groups present in the molecule.

The amount of tertiary amine (III) employed in the reaction mixture is catalytic, i.e., is less than a molar proportion with respect to the polyisocyanate (I) and polyepoxide (II). Advantageously, the tertiary amine is employed in an amount corresponding to about 0.01 equivalent to about 0.5 equivalent per equivalent of polyisocyanate (I). Preferably, the tertiary amine is employed in an amount corresponding to about 0.09 equivalent to about 0.2 equivalent per equivalent of polyisocyanate (I).

The polyisocyanate (I) employed in the preparation of the novel cellular polymers of the invention can be any of the polyisocyanates, organic and inorganic, known to be useful in the art of polymer formation. Such polyisocyanates are commonly employed in the preparation of polyurethanes by reaction with compounds containing two or more active-hydrogen containing groups (i.e., groups which show a positive reaction when tested by the Zerewitinoff method, J. Am.Chem. Soc. 49, 3181, 1927).

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate, 1,5-napthalene diisocyanate, p-phenylene diisocyanate, 1,4-diethylbenzene-$\beta,\beta'$-diisocyanate and other di- and higher polyisocyanates such as those listed in the tables of Siefken, Ann. 562, 122–135 (1949). Mixtures of two or more of the above isocyanates can be used, such as mixtures of the 2,4- and 2,6-isomers of tolylene diisocyanate, mixtures of the 2,4'- and 4,4°-isomer of methylenebis (phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 15° C. and higher using, for example, the processes described in Belgian Pat. No. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Pat. No. 918,454. In accordance with said process, a minor proportion of the methylenebis (phenyl isocyanate) isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis (phenyl isocyanate) exemplified above there can also be employed as the polyisocyanate component a mixture of methylene-bis(phenyl isocyanate) with polymethylene polyphenyl isocyanates of higher functionality. Such mixtures are generally those obtained by phosgenation of corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. Pat. No. 2,683,730; 2,950,263; 3,012,008 and 3,097,191; Canadian Pat. No. 665,495; and German Pat. No. 1,131,877. The preferred polyisocyanates are methylenebis (phenyl isocyanates) and the modified forms thereof including mixtures of polymethylene polyphenyl isocyanates containing from about 35 percent by weight to about 85 percent by weight of methylenebis (phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The polyepoxides (II) employed in the preparation of the novel cellular polymers of the invention can be any compound containing two or more epoxide

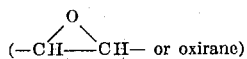
(—CH——CH— or oxirane)

groups. The preferred polyepoxides used in preparing the cellular polymers of the invention are homocyclic polyepoxides.

Such epoxides are characterized by the presence of at least two epoxy groups each of which is present in a substituent attached to a cyclic hydrocarbon compound or is fused to a non-aromatic ring in a cyclic hydrocarbon compound. Examples of homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

2. the glycidyl ethers of non-fused polynuclear phenols represented by the general formula:

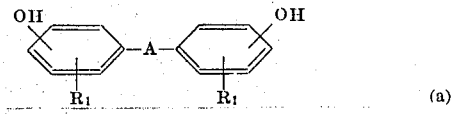
(a)

where $R_1$ represents from 0 to 4 substituents selected from the class consisting of halogen and lower-alkyl, A is a bridging group selected from the class consisting of

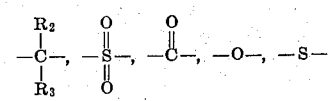

and a single covalent bond, wherein $R_2$ and $R_3$ each represent a moiety selected from the class consisting of hydrogen, lower-alkyl, lower-cyclo-alkyl and aryl. Illustrative of such compounds are the bis(glycidyl ethers) of:
  4,4'-dihydroxydiphenylsulfone,
  4,4'-dihydroxybiphenyl,
  4,4'-dihydroxybenzophenone,
  di(4-hydroxyphenyl)methane (bisphenol F),
  2,2-di(4hydroxyphenyl)butane (bisphenol B),
  2,2-di(4-hydroxyphenyl)propane (bisphenol A),
  1,1-di(4-hydroxyphenyl)propane,
  3,3-di(3-hydroxyphenyl)pentane,
  2-(3-hydroxyphenyl)-2-(4-hydroxyphenyl)butane,
  1-phenyl-1-(2-hydroxyphenyl)-1-(3    -hydroxyphenyl)-propane,
  1-phenyl-1,1-di(4-hydroxyphenyl)butane,
  1-phenyl-1,1-di(4-hydroxyphenyl)pentane,
  1-tolyl-1,1-di(4-hydroxyphenyl)ethane,
  bis(3-bromo-4-hydroxyphenyl)methane
  2,2-bis(3-bromo-4-hydroxyphenyl)propane,
  bis(3-bromo-4-hydroxyphenyl)diphenylmethane,
  1,1-bis(3-bromo-4-hydroxyphenyl)-1-(2,5-dibromo-phenyl)ethane,
  2,2-bis(3-bromo-4-hydroxyphenyl)propionitrile,
  bis(3,5-dibromo-4-hydroxyphenyl)methane,
  2,2-bis(3,5-dibromo-4-hydroxyphenyl)propane,
  bis(3,5-dibromo-4-hydroxyphenyl)diphenylmethane,
  1,1-bis(3,5-dibromo-4-hydroxyphenyl)-1-(2,5-dibromophenyl)ethane,
  bis(3-bromo-4-hydroxyphenyl)sulfone,
  bis(3,5-dibromo-4-hydroxyphenyl)sulfone;

3. the glycidyl ethers of novolac resins. The novolac resins are the products obtained by acid condensation of phenol, or a substituted phenol, with formaldehyde and are conventionally represented by the general formula:

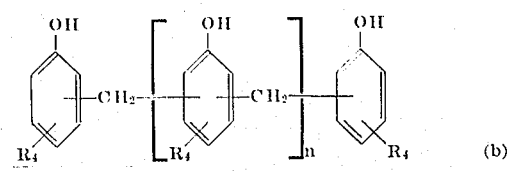
(b)

wherein $n$ has an average value of from about 8 to 12 and $R_4$ represents from 0 to 4 substituents selected from halogen and lower alkyl groups. It is to be understood that the above formula is highly idealized and is an approximation only; see, for example, Carswell, "Phenoplasts," pages 29–35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures e.g., reaction with epichlorohydrin) will be referred to hereafter as "-novolac resin glycidyl ethers;"

4. dicyclopentadiene dioxide i.e., the compound having the formula:

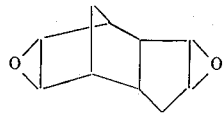

(c)

5. vinyl cyclohexene dioxide, i.e., the compound having the formula:

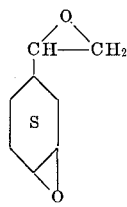

(d)

6. the dicyclohexyl oxide carboxylates represented by the general formula:

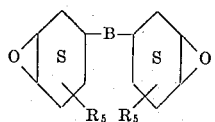

(e)

wherein $R_5$ in each instance represents from 0 to 9 lower-alkyl groups, and B represents a divalent radical selected from the class consisting of:

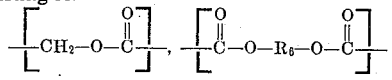

and

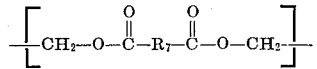

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexane-carboxylate,
3,4-epoxy-6-methylcyclohexylmethyl 3,4-epoxy-6-methylcyclohexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclo-hexanecarboxylate) and the like.

7. the glycidyl derivatives of aromatic primary amines represented by the formula:

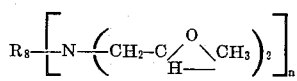

(f)

wherein n is an integer of from 1 to 3 and $R_8$ is an aromatic residue of valency n selected from the class consisting of aromatic residues having the formulae:

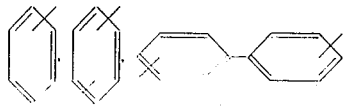

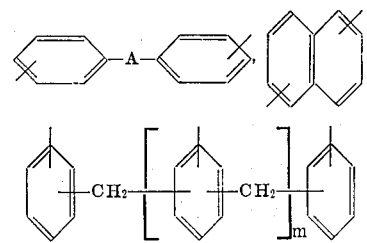

wherein A is a bridging group as hereinbefore defined and m is a number having an average value of from about 0.1 to about 1.0 . Illustrative of such compounds are the N,N -diglycidyl derivatives of:

aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-napthalene, and
methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well-known in the art; see, for example, British Pat. Specification No. 1,042,220.

The term "lower-alkyl" is used throughout this specification and claims as meaning alkyl containing from 1 to 6 carbon atoms such as methyl, ethyl, propyl, butyl, pentyl, hexyl and isomeric forms thereof. The term "halogen" means fluorine, chlorine, bromine, and iodine. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atoms such as cyclobutyl, cyclopentyl, cyclohexyl, cycloheptyl and cyclooctyl. The term "lower-oxyalkylene" means lower-alkylene, as defined above, interrupted by the radical -O-. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from 6 to 12 carbon atoms, inclusive. Illustrative of aryl moieties are phenyl, tolyl, xylyl, biphenylyl, naphthyl and the like.

The homocyclic polyepoxides described and exemplified hereinabove are, for the most part, well-known in the art and can be prepared by methods well-known in the art; see, for example, Lee and Neville, "Epoxy Resins," McGraw-Hill Book Company, New York (1957), U.S. Pat. Nos. 2,633,458; 2,716,123; 2,745,847; 2,745,285; 2,872,427; 2,884,408; 2,902,518; 2,921,037; 3,312,664; 3,268,619; 3,325,452 and British Pat. No. 614,235.

While any of the homocyclic polyepoxide compounds exemplified hereinabove can be used in the preparation of the high temperature resistant polymers of the invention, the preferred compounds for this purpose are those of the groups 2), 3), and 7) set forth above, namely, the glycidyl ethers of non-fused polynuclear phenols represented by the formula (a) above, the novolac resin glycidyl ethers represented by formula (b) above, and the glycidyl derivatives of primary aromatic amines represented by the formula (f) above. The use of epoxides of these classes gives rise to cellular polymers of the invention which possess the highest resistance to deformation by heat and the lowest flame spread rating of the cellular polymers of this class.

Within this particular group of polyepoxides we have found that those which are derived from phenols of the formula (b) above are the most preferred since they give rise to cellular polymers having the highest resistance to flame spread and heat deformation.

The tertiary amines (III) which are employed in accordance with the process of the invention are those which are more usually employed to catalyze the reaction between an isocyanato group and an active hydrogen atom. Such catalysts are a group of compounds well-recognized in the art of synthesising polyurethanes; see, for example, Saunders et al., Polyurethanes, Chemistry and Technology, Part I, pages 228–230, Interscience Publishers, New York, 1964, see also Burkus, J., Journal of Organic Chemistry, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo [2·2·2] octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N', N''-trialkylaminoalkyl-hexahydrotriazines such as N,N', N''-tris(dimethylaminomethyl)-hexahydrotriazine, N,N', N''-tris(dimethylaminoethyl)hexahydrotriazine, N,N'N''-tris(dimethylaminopropyl) hexahydrotriazine, N,N', N''-tris(diethylaminoethyl)hexahydrotriazine, N', N', N''-tris(diethylaminopropyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis(dimethylaminoethyl)-phenol, 2,4-bis(diethylaminobutyl)phenol, 2,4-bis(dipropylaminoethyl)phenol, 2,4-bis(dimethylaminoethyl)thiophenol, 2,4-bis(diethylaminopropyl)thiophenol, 2,4-bis(dipropylaminoethyl)-thiophenol, 2,4,6-tris(dimethylaminoethyl)phenol, 2,4,6-tris(diethylaminoethyl)phenol, 2,4,6-tris(dimethylaminobutyl)phenol, 2,4,6-tris(dipropylaminomethyl)phenol, 2,4,6-tris(diethylaminoethyl)thiophenol, 2,4,6-tris(dimethylaminoethyl)-thiophenol and the like; N,N,N', N'-tetraalkylalkylenediamines such as N,N,N', N'-tetramethyl-1,3-propane diamine, N,N,N', N'-tetramethyl-1,3-butanediamine, N,N,N', N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N', N'-tetraalkylguanidines such as N,N,N', N'-tetramethylguanidine, N,N,N', N'-tetraethylguanidine and the like.

The preferred tertiary amine catalysts for use in preparing the polymer foams of the invention are the triethylenediamines, the N,N', N''-tris(dialkylaminoalkyl)hexahydrotriazines, the mono(dialkylaminoalkyl)phenols, and the 2,4,6-tris(dialkylaminoalkyl)phenols.

If desired, the above tertiary amines (III) can be used in combination with a minor amount, i.e., less than an equal amount by weight, of an organometallic polyurethane catalyst. If such a mixture is used, the proportion of tertiary amine (III) in the mixture is advantageously from about 50 parts to about 95 parts by weight and is preferably from about 60 parts to about 80 parts by weight. Any organometallic compound known to be a catalyst in the reaction between an isocyanato group and an active hydrogen-containing group can be employed in said mixtures; see, for example, Saunders, ibid, Part I, pages 228 to 232, and Britain et al., Journal Applied Polymer Science 4, pages 207 to 211, 1960. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. The preferred group of said organometallic derivatives is that derived from tin, examples of this preferred group are: dibutyl tin diacetate, dibutyltin dilaurate, stannous octoate, stannous oleate, and the like.

The blowing agent which is employed in preparing the cellular polymers of the invention can be water (which generates carbon dioxide by reaction with isocyanate) or a volatile organic solvent such as the lower molecular weight halogenated aliphatic hydrocarbons, namely, those of boiling points from about $-40°$ to about $200°$ C., preferably from about $-°$ to about $110°$ C. Illustrative of such halogenated aliphatic hydrocarbons are difluoromonochloromethane, trichloromonofluoromethane, dichlorodifluoromethane, chlorotrifluoromethane, 1,1,2-trichloro-1,2,2,-trifluoroethane, 1,1-dichloro-1-fluoroethane, 1-chloro-1,1-difluoro-2,2-dichloroethane, 1,1,1-tribromo-2-chloro-2-fluorobutane, methylene chloride and the like.

Generally speaking, the amount of blowing agent employed depends upon the desired density. Thus, if low density foams i.e., 2 to 10 pounds per cubic foot, are desired, the amount of halogenated aliphatic hydrocarbon is from about 5 to about 20 percent by weight based on the total formulation weight. When water is employed as the blowing agent, the amount required to produce foams of density within the above range is from about 0.2 parts to about 3 parts by weight based on the total formulation weight. If desired, a mixture of water and one or more of said halogenated aliphatic hydrocarbons can be employed as blowing agent.

Other optional additives such as dispersing agents, cell stabilizers, surfactants, flame retardants, and the like which are commonly employed in the fabrication of polymer foams, can be employed in the process of the invention. Thus, a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture.

The flame retardants which are employed in the novel cellular polymers of the invention are those flame retardants known in the art which do not contain active hydrogen groups, as hereinbefore defined, i.e., those flame retardants which do not react with the polyisocyanate (I). Illustrative of such flame retardants are: tris(haloalkyl)phosphates such as tris-(2-chloroethyl(phosphate, tris)2-bromoethyl(phosphate, tris)2,3-dichloroethyl)phosphate, tris(2,3-dibromoethyl)phosphate, monoammonium phosphate, ammonium polyphosphates, sodium borate, di(2-haloalkyl)-2-haloalkanephosphonates such as di(2-chloro-ethyl) 2-chloroethane phosphonate, di(2-chloropropyl) 2-chloropropane phospphonate, di(2-bromopropyl) 2-bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethyl phosphorothionate, ethylene phenyl phorphorothionate, tetraholobisphenols such as tetrachlorobisphenol A, tetrabromobisphenol A, and the like. Said flame retardants are employed in the compositions of the invention in the appropriate amounts necessary to impart the desired degree of flame retardancy to the resulting cellular polymer. In general the amount of flame retardant employed is within the range of about 5 to about 30 percent by weight based on polyepoxide (II) although higher amounts, up to about 60 percent by weight based on polyepoxide (II), can be employed in the case of those flame retardants which are solid at ambient temperatures.

However, in general we have found that cellular foams having highly satisfactory fire retardancy and low flame spread properties can be prepared readily without recourse to the use of conventional flame retardants such as those set forth above.

In order to aid in an understanding of the invention, we deem it pertinent to point out that the principal reaction which is believed to take place in the formation of the novel polymers of this invention, is that which leads to the formation of a polyoxazolidinone. This reaction is illustrated schematically below for the condensation of a diisocyanate and a di(epoxide):

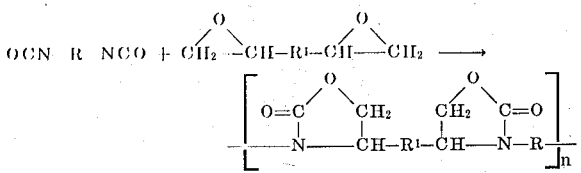

As will be readily appreciated by one skilled in the art, the use of polyisocyanates of functionality greater than 2 and/or the use of polyepoxides having a functionality greater than 2 will lead to more complex polyoxazolidones. However, it is apparent that, in addition to the above reaction, one or more side reactions may occur during the preparation of the cellular polymers of the invention. Such possible side reactions include trimerization of the polyisocyanate (I), and polymerization of the polyepoxide (II). It is to be understood that the above comments as to the likely processes occurring during the formation of the polymer foams of the invention are given for purposes of explanation only and are not be construed as limiting the scope of the present invention in any manner.

The cellular polymers of this invention possess markedly superior high temperature and flame resistant properties as compared with the polymers that are presently available commercially. The cellular polymers of the invention have decomposition temperatures in excess of 500° C. as measured by thermal gravimetric analysis, and very low flame spread ratings as measured by ASTM E 84-61. It is to be noted that these high temperature resistant properties and low flame spread ratings have been achieved in the cellular polymers of the invention without recourse to the flame retardants which have hitherto been incorporated into cellular polymers to achieve flame retardant properties. The introduction of such flame retardants is highly undesirable in order to avoid reducing the structural strength and like properties of the foams. Accordingly, the process and compositions of the invention represent a unique advance in foam technology. In particular, the invention provides for the first time cellular polymers based on polyisocyanates which have sufficiently low flame spread ratings, as measured by the ASTM E 84-61 flame test, to permit the use of such polymers in the construction of domestic and industrial buildings.

Thus, the cellular products of the invention can be employed for all the purposes for which the currently produced cellular products are conventionally employed and are particularly suitable for applications where thermal resistance and low flame spread is required. For example, the cellular products of the invention can be employed as thermal barriers in the construction of fire walls in the building of industrial and institutional structures (e.g., schools, hospitals, etc.) and as insulating materials for high temperature pipe lines and ovens, in supersonic aircraft and also as missile components.

The following examples describe the manner and process of making and using the invention and set forth the best mode contemplated by the inventors of carrying out the invention but are not to be construed as limiting. All parts are by weight unless otherwise stated. The various data relating to thermal stability was derived as follows:

TEST A

The thermal gravimetric analysis was carried out in air, by suspending a weighed, 20–40 milligram, sample from a Cahn RG Electrobalance (Cahn Instrument Co., 15505 Minnesota Avenue, Paramount, California) in a small electrical wire coil furnace. The Cahn Electrobalance was connected to a Speed-O-Max W strip chart recorder (Leeds and Northrup Co., Philadelphia, Pennsylvania). The furnace temperatures were controlled by the voltage applied to the furnace heater. The furnace temperature was raised from room temperature to approximately 1,000° C. in 7 minutes, and sample weight losses were automatically recorded on the strip chart.

TEST B

The Mine Safety Test was carried out in accordance with the procedure of the Bureau of Mines report of investigation RI-6366 by D.W. Mitchell et al.

TEST C

The vertical flame test was carried out by suspending a 1 inch × 1 inch × 10 inch long sample one-half inch above the tip of an artificial gas microburner. The flame temperature, as measured by a portable pyrometer, was 1,580° F. one inch above the burner tip. The flame was applied to the foam sample for 15 seconds and removed, recording the farthest point of flame propagation.

EXAMPLE 1

A series of high temperature resistant rigid cellular polymers was prepared employing the ingredients and proportions set forth in Table I using a foam metering and dispensing modulating unit having a diamond cross-cut impeller rotating at 5,000 rpm (Martin Sweets Company, Inc., Louisville, Kentucky).

The foam ingredients were dispensed as two separate streams at approximately 30 pounds per minute into a 48-inch long by 24-inch wide by 12-inch high cardboard box. One stream comprised a mixture of the polyisocyanate and the

TABLE I

| Ingredients | Foam A | Foam B | Foam C |
|---|---|---|---|
| Component A: | | | |
| Epon-154 [1] | 100 | 100 | 100 |
| PAPI® [2] | 94.2 | 94.2 | 94.2 |
| Component B: | | | |
| SF-1109 [3] | 4.0 | 4.0 | 4.0 |
| Di(2-chloropropyl)2-chloropropane phosphonate | 5.0 | 6.0 | 6.0 |
| Dabco 33LV [4] | 5.5 | 5.0 | 2.6 |
| Isotron 11-B [5] | 16.0 | 30.0 | |
| 1,1,2-trichloro-1,2,2-trifluoroethane | 24.0 | | 35.0 |
| Physical properties: | | | |
| Density, p.c.f. | 1.96 | 1.60 | 2.21 |
| Compressive strength, p.s.i.: | | | |
| Parallel to rise | 34.0 | 20.1 | 35.4 |
| Perpendicular to rise | 19.4 | 7.3 | 26.3 |
| Percent Δ volume at 158° F., 100% relative humidity after—: | | | |
| 3 days | 0.8 | 13.7 | 1.2 |
| 7 days | 1.2 | 15.0 | 1.8 |
| 14 days | 1.9 | 15.4 | |
| Percent Δ volume at 200° F. ambient relative humidity after—: | | | |
| 3 days | 1.2 | 14.7 | 1.2 |
| 7 days | 1.7 | 16.5 | 1.7 |
| K factor: | | | |
| B.t.u./hr./sq. ft./° F./in | 0.128 | 0.127 | 0.121 |
| Percent closed cells | 94 | 94 | 96 |
| ASTM D 1692-59T flame test: Maximum inches burned | 0.1 | 0.4 | 0.1 |
| 30/30 tunnel test [6]: flame spread rating | 40 | 50 | 50 |
| Thermo gravimetric analysis (test A): | | | |
| Percent weight loss at: | | | |
| 300° C | | 13 | |
| 400° C | | 24 | |
| 500° C | | 39 | |
| 525° C | | 61 | |
| ASTM D 84-61 tunnel test: flame spread rating | | 50 | |

[1] Epoxy novolac resin, epoxy equivalent weight 178, see Shell Chemical Co. Technical Bulletin SC: 65-34.
[2] Polymethylene polyphenyl isocyanate, isocyanate equivalent 131, containing approximately 50 percent by weight methylene bis(phenyl isocyanate).

homocyclic polyepoxide and the second stream was a mixture of the catalyst, blowing agent, surfactant, and flame retardant. Physical properties of the resultant foams were measured, after aging approximately 48 hours at room temperature (20° to 30° C.), using the test procedures set forth in the manual of "Physical Test Procedures of the Atlas Chemical Industries, Inc." unless otherwise indicated.

EXAMPLE 2

A series of high temperature resistant cellular polymers was prepared employing the ingredients and proportions set forth in Table II. All of the ingredients, except the catalyst, were mixed together in a one gallon ice cream container. The catalyst was incorporated into the reaction mixture with agitation just prior to foaming. After addition of the catalyst the blend was mechanically agitated at 4,000 rpm for approximately 5 to 10 seconds using a heavy duty drill press equipped with a Conn blade. Upon completion of mixing the composition was permitted to foam and cure at room temperature (circa 20° to 30° C.) for approximately 48 hours. Flame resistance was determined in accordance with the ASTM D 1692-59T test method.

TABLE II

| Ingredients | Foams | | | | |
|---|---|---|---|---|---|
| | D | E | F | G | H |
| DEN-438 [1] | 100 | 100 | 100 | 100 | 100 |
| SF-1109 | 3 | 3 | 3 | 3 | 3 |
| Isotron 11-B | 22 | 22 | 22 | 22 | 21 |
| PAPI® | 82 | 61.5 | 41 | 20.5 | |
| Polyisocyanate [2] | | 22.3 | 44.5 | 66.8 | 89 |
| Dabco 33LV | 6 | 4 | 4 | 4 | 4 |
| ASTM D 1692-59T Flame test: Total inches burned | 0.2 | 0.5 | 0.7 | 0.8 | 0.9 |

[1] Epoxy novolac resin, average epoxy equivalent weight 178; see Dow Chemical Technical Bulletin No. 170-143A.
[2] Modified methylenebis (phenyl isocyanate), prepared by heating methylenebis (phenyl isocyanate) containing 94 percent 4,4'-isomer and 6 percent 2,4'-isomer in the presence of 3 percent by weight of triethyl phosphate at 220° C. for 3 hours before cooling to approximately 70° C.; the resultant isocyanate equivalent was 143. Henceforth, this polyisocyanate will be referred to as the "polyisocyanate of Example 2".
[3] A block co-polymer of a dimethyl polysiloxane and polyethylene oxide surfactant; see General Electric Corp Technical Bulletin SF-1109.
[4] Thirty-three percent solution of 1,4-diazabicyclo[2.2.2]-octane in dipropylene glycol; see Houdry Process and Chemical Co. Technical Data "Dabco 33LV," January 1, 1963.
[5] Inhibited trichlorofluoromethane: see Pennsalt Chemical Bulletin IF-101-3M664.
[6] See the article by M. M. Levy, "A Simplified Method for Determining Flame Spread," Journal of Cellular Plastics, April 1967, vol. 3, No. 4, pages 168-173.

EXAMPLE 3

Following the method of preparation of Example 2, two high temperature, flame resistant cellular polymers were prepared employing the ingredients and proportions set forth in Table III. Mechanical properties of the resultant foams were determined using the test methods set forth in Example 1.

TABLE III

| Ingredients | Foam | |
|---|---|---|
| DER-331 [1] | 100 | 100 |
| PVC-4185 [2] | | 10 |
| SF-1109 | 3 | 3 |
| Isotron 11-B | 28 | 30 |
| PAPI® | 79 | 79 |
| Dabco 33LV | 3 | 3 |
| Stannous octoate | 2 | 2 |
| Foam physical properties: | | |
| Density, p.c.f. | 2.16 | 2.55 |
| Compressive strength, p.s.i. | 24.8 | 22.5 |
| Percent Δ volume at 158° F., 100% relative humidity after— | | |
| 1 day | 6.7 | 16.2 |
| 3 days | 8.2 | 17.9 |
| 7 days | 9.0 | 17.5 |
| Percent Δ volume at 200° F., ambient relative humidity after— | | |
| 3 days | 6.0 | 15.6 |
| 7 days | 6.3 | 15.2 |
| Percent closed cells | 92 | 86 |
| ASTM D 1692-59T flame test: Total inches burned | 0.9 | 0.7 |
| Bureau of Mines test (Test B above): Burn through time (min.-sec.) | 37-45 | 51-07 |

[1] Reaction product of bisphenol-A and epichlorohydrin, average epoxy equivalent weight 189; see Dow Chemical Technical Bulletin No. 174-141-A.
[2] Medium molecular weight polyvinyl chloride homopolymer, see Escambia Chemical Corporation Product Bulletin No. 1-30.

EXAMPLE 4

Employing the procedure of Example 2 a series of high temperature resistant, low flame spread cellular polymers was prepared using the ingredients and proportions set forth in Table IV. Flame resistance was determined after curing 48 hours at room temperature.

TABLE IV

| Ingredients | Foam | | | | | |
|---|---|---|---|---|---|---|
| | K | L | M | N | O | P |
| DEN-438 | 100 | 100 | 100 | 100 | 100 | 100 |
| SF-1109 | 2 | 2 | 2 | 2 | 2 | 2 |
| Isotron 11-B | 27 | 27 | 27 | 27 | 27 | 27 |
| Polyisocyanate of Example 2 | 89 | 89 | 89 | 89 | 89 | 89 |
| Dabco 33LV | 4 | 4 | 4 | 4 | 4 | 4 |
| Phosgard C-22-R [1] | | 10 | | | | |
| Celluflex CEF [2] | | | 10 | | | |
| PVC-4185 | | | | 20 | | |
| Geon-121 [3] | | | | | 20 | |
| Phoschek P-30 [4] | | | | | | 40 |
| Vertical flame test (Test C above): Total inches burned | 4.25 | 3.25 | 3.00 | 3.75 | 3.75 | 1.75 |

[1] Additive type (non-reactive) flame retardant containing 27 percent chlorine and 15 percent phosphorus, see Monsanto Technical data sheet 1635-1.
[2] Tris(beta-chloroethyl)phosphate, see Celanese Product Bulletin No. S-46-3.
[3] Polyvinyl chloride resin, see B. F. Goodrich Chemicals Service Bulletin PR-4, revised October 1958.
[4] Ammonium polyphosphate, see Monsanto Technical Bulletin 1-270.

EXAMPLE 5

Following the procedure of Example 2, high temperature resistant foams were prepared using the ingredients and proportions set forth in Table V.

TABLE V

| Ingredients | Foam | |
|---|---|---|
| | Q | R |
| DEN-438 | 100 | |
| Epon-828 [1] | | 100 |
| SF-1109 | 3 | 3 |
| Isotron 11-B | 28 | 28 |
| PAPI® | 82 | 82 |
| Dabco 33LV | 3 | 3 |
| Di(phenylmercuryl) dodecenyl succinate | 1 | |
| Dibutyltin dilaurate | | 2 |

[1] Reaction product of bisphenol A and epichlorohydrin; average epoxy equivalent weight 188, see Shell Chemical Technical Data sheet SC: 60-146R.

The density of the resultant foams was approximately 3.0 pounds per cubic foot.

EXAMPLE 6

Following the procedure of Example 2, a high temperature resistant foam was made employing as epoxide the reaction product, using the procedure of U.S. Pat. No. 2,951,822, Example II, of epichlorohydrin and a mixture of (i) 70 percent by weight of a polymethylene polyphenylamine mixture containing about 70 percent by weight of methylenedianilines and (ii) 30 percent by weight of aniline as the polyepoxide. The average epoxy equivalent weight of the resultant product was 107. The resultant foam had a fine uniform cell structure, a density of approximately 2.0 pcf and was non-burning. The ingredients and proportions were as follows:

TABLE VI

| Ingredients | Foam S |
|---|---|
| Polyepoxide | 100 |
| L-5310 [1] | 2 |
| Isotron 11-B | 36 |
| PAPI® | 137 |
| Dabco 33LV | 3 |

[1] Organo-silicone surfactant see Union Carbide Bulletin, "Silicones for Polyurethane Foams," revised edition, April, 1963.

We claim:

1. A high temperature resistant cellular polyoxazolidinone polymer which comprises the product of reaction, in the absence of externally supplied heat, of a mixture consisting essentially of:
   1. an organic polyisocyanate;
   2. a polyepoxide in a proportion of from about 0.70 equivalent to about 1.25 equivalents per equivalent of polyisocyanate;
   3. a tertiary amine catalyst; and
   4. a blowing agent.

2. A high temperature resistant cellular polymer according to claim 1 in which the tertiary amine catalyst is triethylenediamine.

3. A high temperature resistant cellular polymer according to claim 1 in which the organic polyisocyanate is a polymethylene polyphenyl isocyanate containing from about 35 to about 85 percent by weight of methylenebis(phenyl isocyanate) the remainder of said mixture being polymethylene polyphenyl isocyanate of functionality greater than 2.0.

4. A high temperature resistant cellular polymer according to claim 1 in which the organic polyisocyanate is a polymethylene polyphenyl isocyanate containing about 50 percent by weight of methylenebis(phenyl isocyanate) the remainder of said mixture being polymethylene polyphenyl isocyanate of functionality greater than 2.0.

5. A high temperature resistant cellular polymer according to claim 1 in which the polyepoxide is a diglycidyl ether of a non-fused polynuclear polyhydric phenol having the formula:

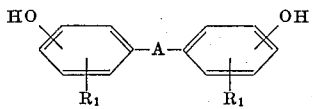

wherein $R_1$ represents from 0 to 4 substituents selected from the class consisting of halogen and lower-alkyl, and A is a bridging group selected from the class consisting of

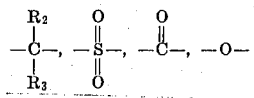

and a single covalent bond, wherein $R_2$ and $R_3$ each represent a moiety selected from the class consisting of hydrogen, lower-alkyl, lower-cycloalkyl, and aryl.

6. A high temperature resistant cellular polymer according to claim 1 in which the polyepoxide is the polyglycidyl ether of a novolac resin.

7. A high temperature resistant cellular polymer according to claim 1 in which the polyepoxide is a compound of the formula:

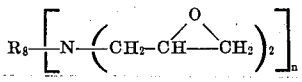

wherein $n$ is an integer of from 1 to 3 and $R_3$ is an aromatic residue of valency n.

8. A high temperature resistant cellular polymer according to claim 1 in which the blowing agent is selected from the group consisting of water, a halogenated aliphatic hydrocarbon having a boiling point within the range of about $-20°$ C. to about $110°$ C., and mixtures thereof.

* * * * *